United States Patent [19]
Stanton et al.

[11] Patent Number: 5,613,161
[45] Date of Patent: Mar. 18, 1997

[54] METHOD AND APPARATUS FOR PREEMPTABLE MULTIPLEXING OF CONNECTIONS TO INPUT/OUT DEVICES

[75] Inventors: Scott N. Stanton, Menlo Park; Jeff Peck, Sunnyvale; Ben Stoltz, Mountain View, all of Calif.

[73] Assignee: Sun Microsystems, Inc., Mountain View, Calif.

[21] Appl. No.: 239,326

[22] Filed: May 6, 1994

[51] Int. Cl.$^6$ ........................................ G06F 13/10
[52] U.S. Cl. ............................................ 395/841
[58] Field of Search ................ 364/DIG. 1 MS File, 364/DIG. 2 MS File; 395/200.01, 250, 650, 700, 821, 840, 841, 849, 872, 874, 893

[56] References Cited

FOREIGN PATENT DOCUMENTS

| 0192924 | 9/1986 | European Pat. Off. . |
|---|---|---|
| 0550196 | 7/1993 | European Pat. Off. . |

OTHER PUBLICATIONS

Simpson, David, The Streams Machine, Mini–micro Systems, vol. 22, No. 2, Feb. 1989, pp. 62–71.

Krieger et al., The Alloc Stream Facility, A redesign of application level stream I/O, Computer, vol. 27, No. 3, Mar. 1994, pp. 75–82.

Presotto et al., Interprocess Communication in the Eighth Edition Unix System, USENIX Association Summer Conference proceedings 1985, USENIX Assoc., pp. 309–316.

Neal Nuckolls "GPMUX–A Generic Provider Multiplexing Streams Driver", pp. 1–10.

*Primary Examiner*—Robert B. Harrell
*Attorney, Agent, or Firm*—Blakely, Sokoloff, Taylor & Zafman LLP

[57] ABSTRACT

A multiplexing non-device specific stream module is provided to an operating system. The multiplexing non-device specific stream module includes a number of upper and lower ports. Each port, lower as well as upper, has a write queue, a read queue, and an associated control and status data area. Additionally, the multiplexing non-device specific stream module further includes a number of service routines, in particular, a splice/unsplice routine, a change ownership routine, and a query ownership routine. Together, these elements cooperate to allow multiplexing of connections to input/output devices with improved performance and flexibility, while maintaining compatibility.

22 Claims, 12 Drawing Sheets

62 or 64

| | |
|---|---|
| ID | 70 |
| Upper/Lower Port | 72 |
| Original Owner | 74 |
| Current Owner | 76 |
| Current Owner State | 77 |
| Destination Port | 78 |
| Pending/Spliced | 88 |
| Write Queue Control and State Information | 90 |
| Read Queue Control and State Information | 92 |

*Figure 6*

METHOD AND APPARATUS FOR PREEMPTABLE MULTIPLEXING OF CONNECTIONS TO INPUT/OUT DEVICES

BACKGROUND OF THE INVENTION

1. Field of the Invention

The present invention relates to the field of computer systems. More specifically, the present invention relates to accessing input/output devices of computer systems by executing programs.

2. Background Information

Input/Output (I/O) devices are typically accessed by executing programs through device drivers provided by the operating systems of the computer systems. The device drivers serve to shield the device characteristics from the executing programs. To facilitate implementation of device drivers, particularly device drivers for character devices, some common functions are implemented as intermediate non-device specific I/O modules. To access an I/O device, an executing program would logically connect itself to the I/O device through the I/O device's device driver, with or without going through one or more non-device specific I/O modules depending on the implementation.

Unlike execution time or memory resource where most operating systems include some kind of timesharing or prioritization schemes, connections to character devices are typically implemented in exclusive manners. In other words, once an executing program connects itself to a character device, the character device is not available to other executing programs until the connecting executing program relinquishes the character device. In many applications, experience has shown that exclusive connections to certain character device resources adversely impact system performance, e.g. connections to various types of audio channels in a telephonic application. It is more desirable if the connections to these character device resources are preemptable.

A prior art solution is to implement a policy server and a switching controller in user space. Accessing programs are required to be connected to the device drivers through the switching controller, and switching preemption is regulated by the policy server. However, because the policy server and the switching controller are in user space, while the device drivers and the intermediate non-device specific I/O modules are in system space, the prior art solution suffer from the disadvantage of having to have multiple copies of data maintained in both user and system space. As a result, significant amount of system resource are consumed in copying and transferring data between the user and system space. This negative performance impact increases exponentially with increased volume of data traffic.

Thus, it is desirable to be able to implement preemptable multiplexing of connections to I/O devices with improved performance characteristics. It is also desirable that the new enhanced solution is backward compatible and can operate in a manner that is transparent to existing applications who have no knowledge of the new enhanced solution. As will be disclosed, the present invention provides such a method and apparatus for multiplexing connections to I/O devices that achieves these and other desired results.

SUMMARY OF THE INVENTION

The desirable results are advantageously achieved by providing a multiplexing non-device specific stream module to an operating system. The multiplexing non-device specific stream module includes a number of upper and lower ports. Each port, lower as well as upper, has a write queue, a read queue, and an associated control and status data area. Additionally, the multiplexing non-device specific stream module further includes a number of service routines, in particular, a splice/unsplice routine, a query owner routine, and a change ownership routine.

The upper ports are used to facilitate attachment by upper streams, i.e. application programs with or without intervening non-device specific stream modules, whereas the lower ports are used to facilitate attachment by lower streams, i.e. device drivers with or without intervening non-device or device specific stream modules. The upper and lower write queues are used to stage data being moved "downstream", whereas the upper and lower read queues are used to stage data being moved "upstream". The splice/unsplice routine is used to splice and unsplice ports together, thereby enabling and disabling data flow paths between the attached streams. The splicing and unsplicing operations are preferably secured based on port ownership. Ownership is originally assigned at the time of attachment. The change ownership routine is used by the port owners to temporary alter the ownership assignments of the owned ports. The query owner routine is used by the attached streams to identify port ownership.

BRIEF DESCRIPTION OF THE DRAWINGS

FIG. 6 illustrates the key data elements in the upper/lower write and read queue control and status data areas of FIG. 4.

DETAILED DESCRIPTION

Figure 1:
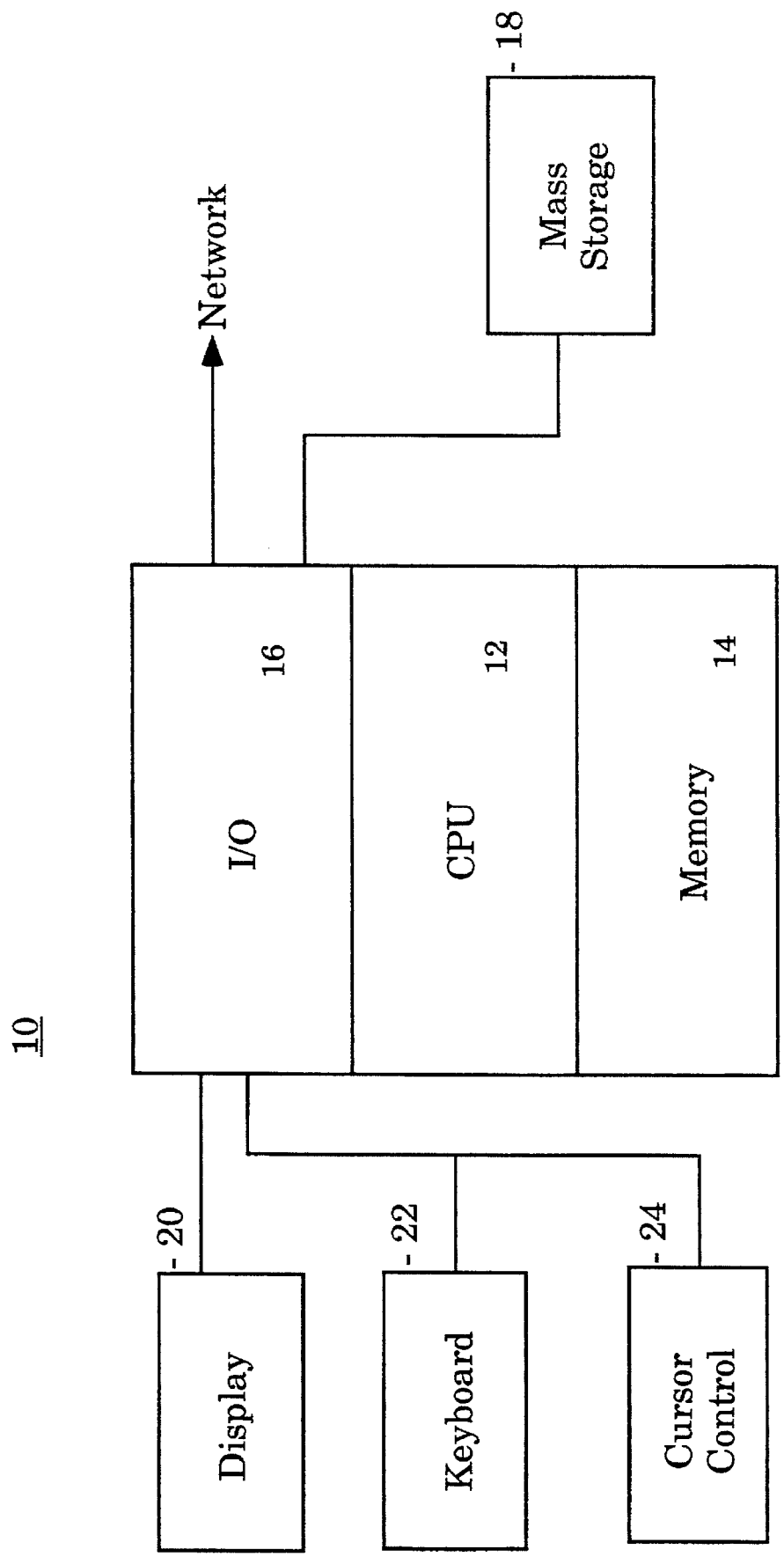
FIG. 1 is an exemplary computer system incorporating the teachings of the present invention.

In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatic or block diagram form in order not to obscure the present invention. Additionally, elements in the drawings are given unique reference numbers. For ease of explanation, these unique reference numbers are used in the descriptions whenever the elements are mentioned, even the elements might not be shown in the particular subsequent Figure being described. For example, the computer system is first assigned the unique reference number 10 when shown in FIG. 1. When the computer system is referred to in subsequent descriptions of different aspects of the computer system, it will still be referred to as "the computer system 10" even though the overall "computer system" is not shown in the Figure being described.

Referring now to FIG. 1, a block diagram illustrating an exemplary computer system incorporating the teachings of the present invention is shown. The exemplary computer system 10 comprises a central processing unit (CPU) 12, memory 14, and input/output circuitry 16. Additionally, the exemplary computer system 10 further comprises mass storage 18, and a number of user input/output devices, such as display 20, keyboard 22, and cursor control devices 24. These elements 12–24 are coupled to each as shown. Together, they execute a number of software elements, in particular an operating system incorporated with the teachings of the present invention, which will be described in more detail below. Otherwise, the hardware elements 12–24 are intended to represent a broad category of CPU, memory, etc. found in many computer systems, whose functions and constitutions are well known and will not be described further.

Figure 2:
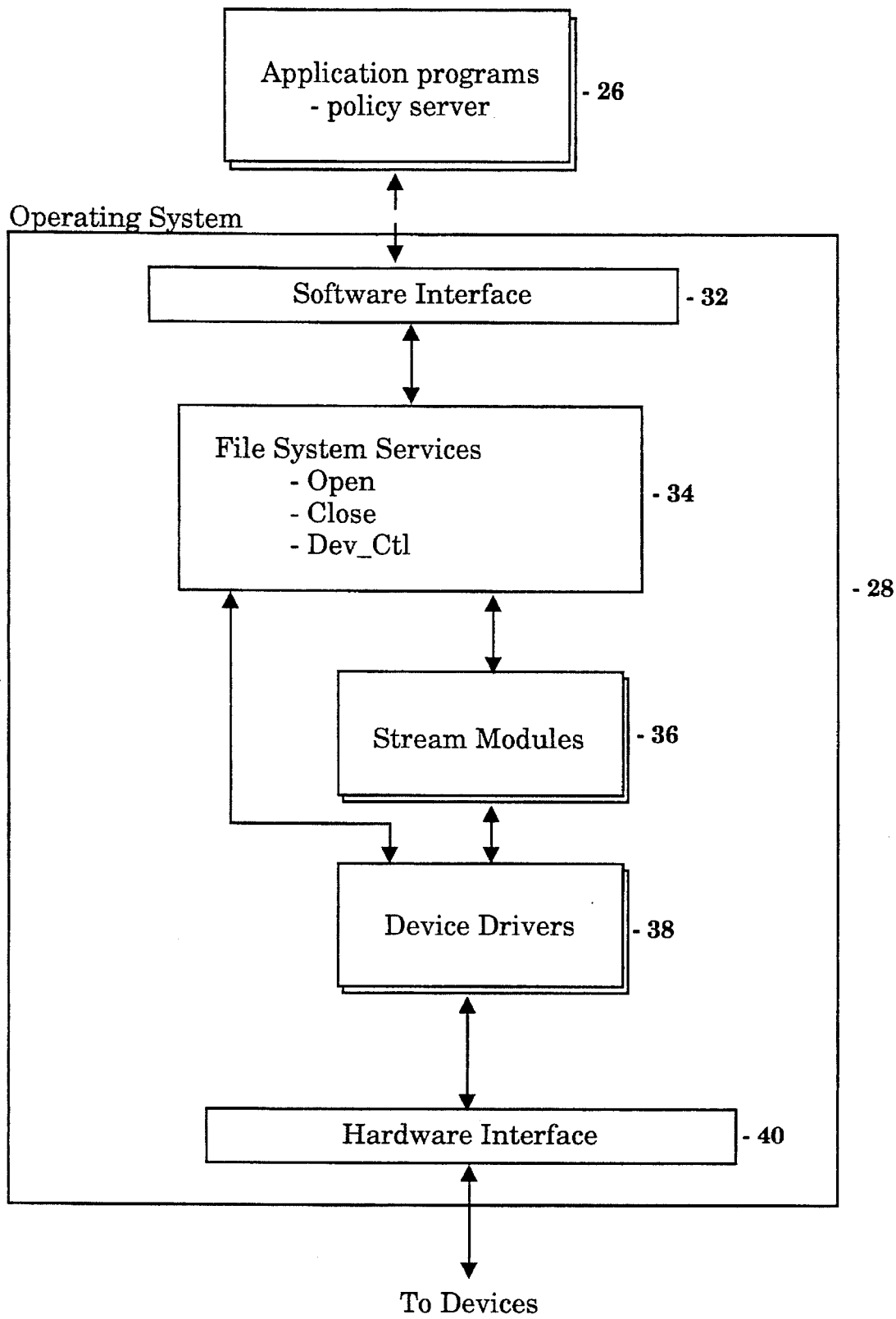
FIG. 2 illustrates the key software elements of the exemplary computer system of FIG. 1.

Referring now to FIG. 2, a block diagram illustrating the key software elements of the exemplary computer system of FIG. 1 is shown. As illustrated, the software elements include an operating system 28 incorporating the teachings of the present invention, and a number of application programs 26. The operating system 28 comprises a software interface 32, a number of file service routines 34, a number of stream modules 36, a number of device drivers 38, and a hardware interface 40, cooperating with each other as shown. The software interface 32 serves as a call interface for the application programs 26 for invoking the various system services offered by the operating system 28. In particular, the system services include a file opening service, a file closing service, and a device controlling service. The stream modules 36 provide common I/O functions for accessing the character devices. In particular, the stream modules 36 include the multiplexing non-device specific stream module of the present invention. Generally, stream modules 36 cooperate with each other in a serial manner, forming a number of I/O streams. An I/O stream is a fully-duplex connection between an application program 26 and a device driver 38 of a character I/O device. The device drivers 38 facilitate accesses to the devices, through the hardware interface 40. Except for the multiplexing non-device specific stream module of the present invention, and the manner the other software elements cooperate with it, the software elements 26–40 are also intended to represent a broad category of programs, service routines, and device drivers found in many computer systems, whose functions and constitutions are also well known and will not be further described.

Figure 3:
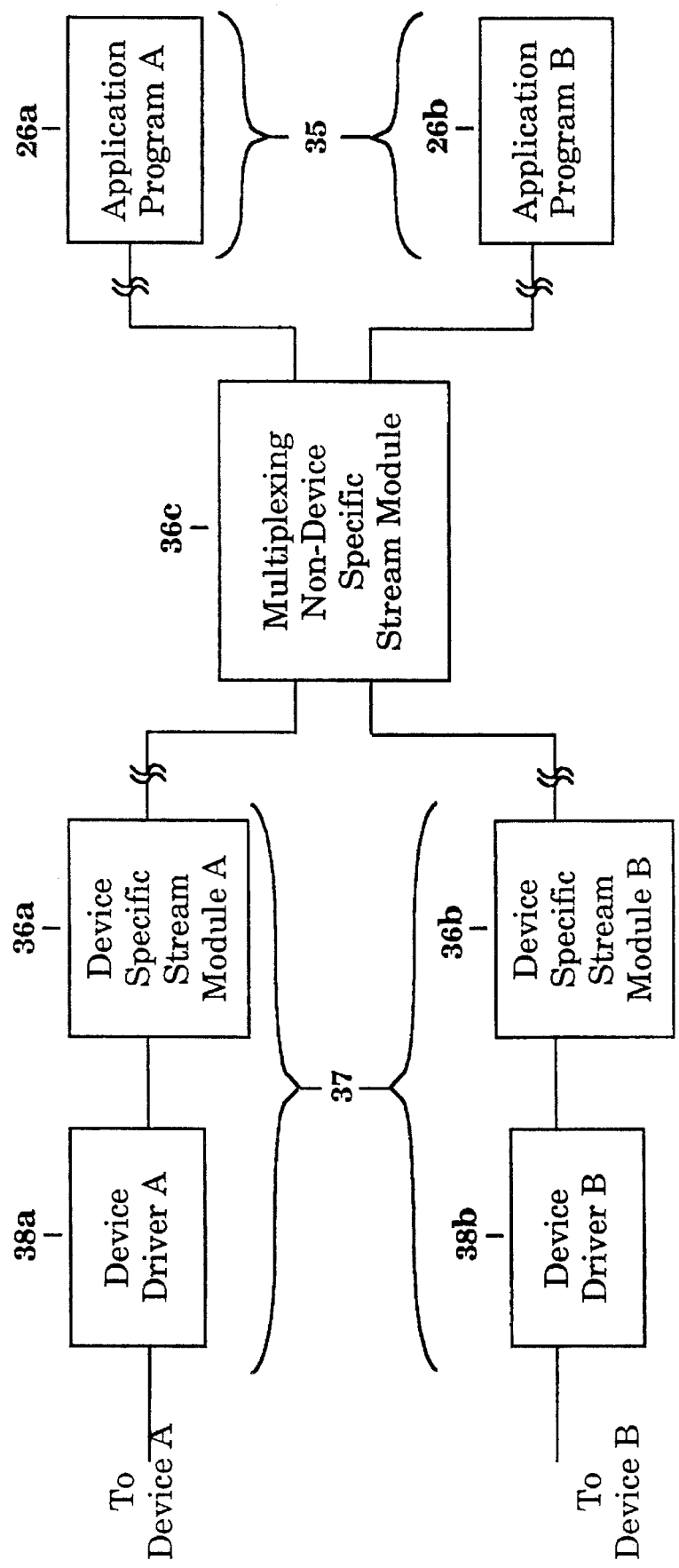
FIG. 3 illustrates the architectural relationship of the multiplexing non-device specifying stream module of the present invention with other software elements.

Referring now to FIG. 3, a block diagram illustrating the architectural relationship of the multiplexing non-device specifying stream module of the present invention with other software elements in further detail is shown. The multiplexing non-device specifying stream module of the present invention 36c is used to multiplex logical connections between a number of upper streams 35 and a number of lower streams 37, including loopback connections between two upper streams 35 as well as two lower streams 37.

Each upper stream 35 comprises an application program 26a or 26b, and zero or more intervening non-device specific stream modules (none shown). Similarly, each lower stream 37 comprises a device driver 38a or 38b, and zero or more intervening device or non-device specific stream modules, e.g. 36a and 36b. In other words, in the context of the present invention, an application program 26a or 26b directly connected to the multiplexing non-device specific stream module 36c without any intervening non-device specific stream modules is simply a single module upper stream 35, whereas a device driver 38a or 38b directly connected to the multiplexing non-device specific stream module 36c without any intervening device or non-device specific stream modules is simply a single module lower stream 37.

More specifically, an upper stream 35 is attached to an upper port (66 of FIG. 4) of the multiplexing non-device specifying stream module 36c, whereas a lower stream 37 is attached to a lower port (68 of FIG. 4) of the multiplexing non-device specifying stream module 36c. An upper stream 35 causes itself to be attached to and detached from an upper port 66, whereas, a lower stream 37 is caused to be attached to and detached from an lower port 68 by an upper stream 37. An upper stream 35 may cause itself to be attached to more than one upper port 66, however, a lower stream is caused to be attached to at most one lower port 68.

In one embodiment, an upper stream 35 causes itself to be attached to and detached from an upper port 66 using the operating system's file subsystem open and close file service, and causes a lower stream to be attached to an lower port 68 using the operating system's file subsystem device control link and unlink services.

The upper stream 35 who causes itself to be attached to an upper port 66 is considered the original owner of the upper port 66, and the upper stream 35 who causes a lower stream 37 to be attached to a lower port 68 is considered the original owner of the lower port 68. On detachment, ownership is relinquished. As will be described in more detail later, under the present invention, port ownerships are preferably changeable, and furthermore, preferably in a secured manner. In one embodiment, only the original owner and the current assigned owner may change the ownership of a port 66 and 68.

Two attached streams 35 and/or 37 are logically connected to each other by dynamically splicing their attached upper and/or lower ports 66 and/or 68 together. To logically disconnect the two connected attached streams 35 and/or 37, their attached upper and/or lower ports 66 and/or 68 are dynamically unspliced from each other.

Splicing and unsplicing of ports 66 and/or 68 are preferably performed in a secured manner based on port ownership. In other words, only the owner of a port 66 or 68 is able to request a splice or unsplice operation to be performed on the port 66 or 68. A splicing operation is also preferably performed in a preemptable manner. In other words, two ports 66 and/or 68 that were previously spliced together will be unspliced in favor of a splicing request from the owner of one of the ports 66 and/or 68 to splice the port 66 or 68 to a third port 66 or 68.

In one embodiment, a splicing operation is performed in an unidirectional manner. In other words, it takes two splicing operations to actually splice two ports 66 and/or 68 together, a first splice operation for splicing the first port 66 or 68 to the second port 66 or 68, and a second splice operation for splicing the second port 66 or 68 to the first port 66 or 68. The two ports 66 and/or 68 are merely placed in a splice pending state as a result of the first splice operation, and the actual splice is completed as a result of the second splice operation. For the first splice operation, the first port 66 or 68 is referred to as the source port, whereas the second port 66 or 68 is referred to as the target port. Similarly, for the second splice operation, the second port 66 or 68 is referred to as the source port, whereas the first port 66 or 68 is referred to as the target port.

Data flow between two streams 35 and/or 37 is enabled when their attachment ports 66 and/or 68 are spliced together, and disabled when their attachment ports 66 and/or 68 are unspliced. Disposition of data flowing from a stream 35 or 37 attached to a port 66 or 68 that is not spliced with another port 66 or 68 is implementation dependent.

In one embodiment, data flowing from a stream 35 or 37 attached to a port 66 or 68 that is not spliced with another port 66 or 68 are queued. However, queued data may optionally be flushed when the port 66 or 68 is eventually spliced with another port 66 or 68, depending on the configuration option chosen. In an alternate embodiment, data flowing from a stream 35 or 37 attached to a port 66 or 68 that is not spliced with another port 66 or 68 are flushed instead.

Figure 4:
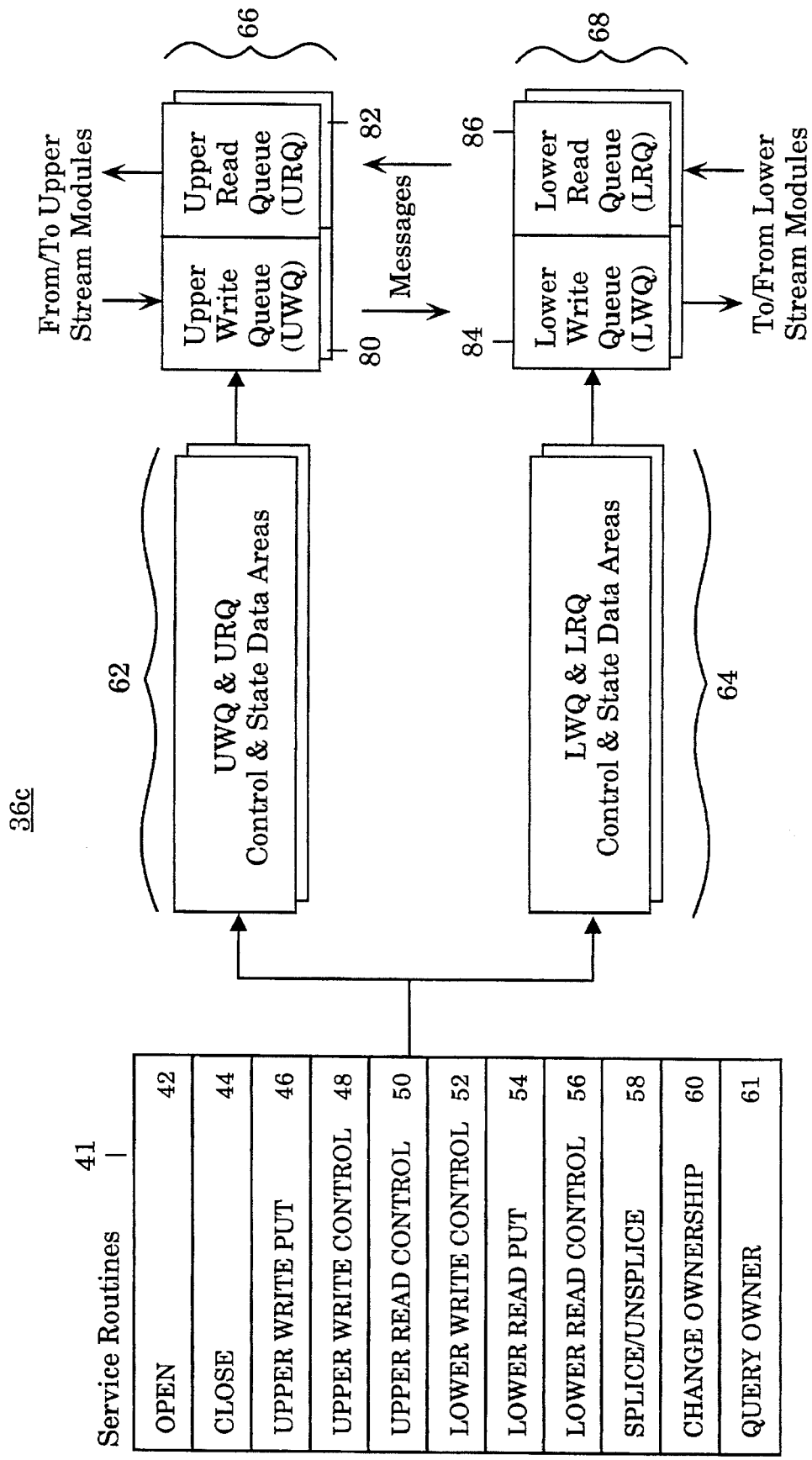
FIG. 4 illustrates the relevant portions of one embodiment of the multiplexing non-device specifying stream module of FIG. 3 in further detail.

Referring now to FIG. 4, a block diagram illustrating the multiplexing non-device specific stream module 36c of the present invention in further detail is shown. In addition to the upper and lower ports 66 and 68 described above, the multiplexing non-device specific stream module 36c further comprises a number of control and state data areas 62 and 64, and a number of service routines 41.

Each port 66 or 68, lower as well as upper, includes a write queue 80 or 84, and a read queue 82 or 86. There is one control and state data area 62 or 64 associated with each pair of write and read queues 80–82 or 84–86. The service routines 41 includes an open routine 42, a close routine 44, an upper write put routine 46, an upper write control routine 48, an upper read control routine 50, a lower write control routine 52, a lower read put routine 54, a lower read control routine 56, a splice/unsplice routine 58, a change ownership routine 60, and a query owner routine 61.

As described earlier, the upper ports 66 are used to facilitate attachment of upper streams 35, whereas the lower ports 68 are used to facilitate attachment of lower streams 37. The write and read queues 80–86 are used to stage the data flowing from one stream to another 35 or 37. The associated control and state data areas 62 and 64 are used to store the control and state information about the corresponding write and read queues 66 and 68.

The open and close service routines 42 and 44 are used to attach and detach an upper stream 35 to one of the upper ports 66. The query owner service routine 61 is used to identify the current owner of a port 66 or 68 to a querying upper stream 35. The change ownership service routine 60 is used to change temporarily the current ownership of the ports 66 and 68. As described earlier, ownership changes are preferably secured by port ownerships. In other words, an upper stream 35 preferably can only change port ownerships of the ports 66 and 68 it owns. The splice/unsplice service routine 58 is used to connect and disconnect the ports 66 and/or 68 from each other, thereby enabling and disabling data flow paths between the attached streams 35 and/or 37. As described earlier, splicing/unsplicing of ports 66 and/or 68 are preferably secured by port ownerships.

The upper write put routine 46 is used by an upper stream module immediately preceding the multiplexing non-device specific stream module 36c of the present invention on an I/O stream to move data "downstream" into the write queue 80 of its attached upper port 66, whereas the lower read put service routine 54 is used by a lower stream module immediately succeeding the multiplexing stream module 36c of the present invention to move data "upstream" into the read queue 86 of its attached lower port 68.

In one embodiment, the put routines 46 and 54 are further provided with logic to expedite high priority data, moving them straight into the next "downstream" or "upstream" module, skipping the upper or lower queue 80–86.

The upper write and read control routines 48–50 are used to service the corresponding upper write and read queues 80–82, maintaining their corresponding control and state data in the associated control and state data areas 62. Similarly, the lower write and read service routines 52 and 56 are used to service the corresponding lower write and read queues 84–86, maintaining their corresponding control and state data in the associated control and state data areas 64. Additionally, the upper read control routine 50 is used to invoke the "put" service routine of the immediately preceding stream module to move the data "upstream", whereas the lower write control routine 52 is used to invoke the "put" service routine of the immediately succeeding stream module to move the data "downstream". Furthermore, the upper write control routine 48 is used to move queued data internally from an upper write queue 80 to a lower write queue 84 or an upper read queue 82, whereas, the lower read control routine 56 is used to move queued data internally from a lower read queue 86 to an upper read queue 82 or a lower write queue 84.

The open and close routines 42 and 44 are invoked indirectly by the upper streams 35 through the operating system's file subsystem open and close file services and I/O control interface, in accordance to the operating system's I/O stream convention. The query owner routine 61, the change ownership routine 60, and the splice/unsplice routine 58 are invoked by the upper streams 35 also through the I/O control interface. The upper write put routine 46, the lower read put routine 54, as well as the "put" service routines of the immediately preceding and succeeding stream modules, are invoked by the immediately preceding and succeeding stream modules through the operating system's data stream interface, in accordance to the operating system's I/O stream convention. Lastly, the upper and lower write and read control routines 48–52, and 56, are also invoked by the upper and lower write and read put routines 46 and 54 through the I/O stream interface.

The open and close service routines 42 and 44, the upper write and lower read put routines 46 and 54, and the upper as well as lower write and read control service routines 48, 50, 52, and 56 may be implemented in like manners as similar routines implemented for a broad category of non-device specific stream modules found on many computer systems executing operating systems that support I/O streams, which are well known and will not be further described. The implementations of the unsplice function of the splice/unsplice service routine 58, and the query owner service routine 61 are straight forward, and will not be further described either. The splice function of the splice/unsplice service routine 58, attachment of upper and lower streams 35 and 37 to the upper and lower ports 66 and 68, splicing and unsplicing the ports 66 and/or 68 from each other, as well as changing of ownership will be described in more detail below.

Figure 5:
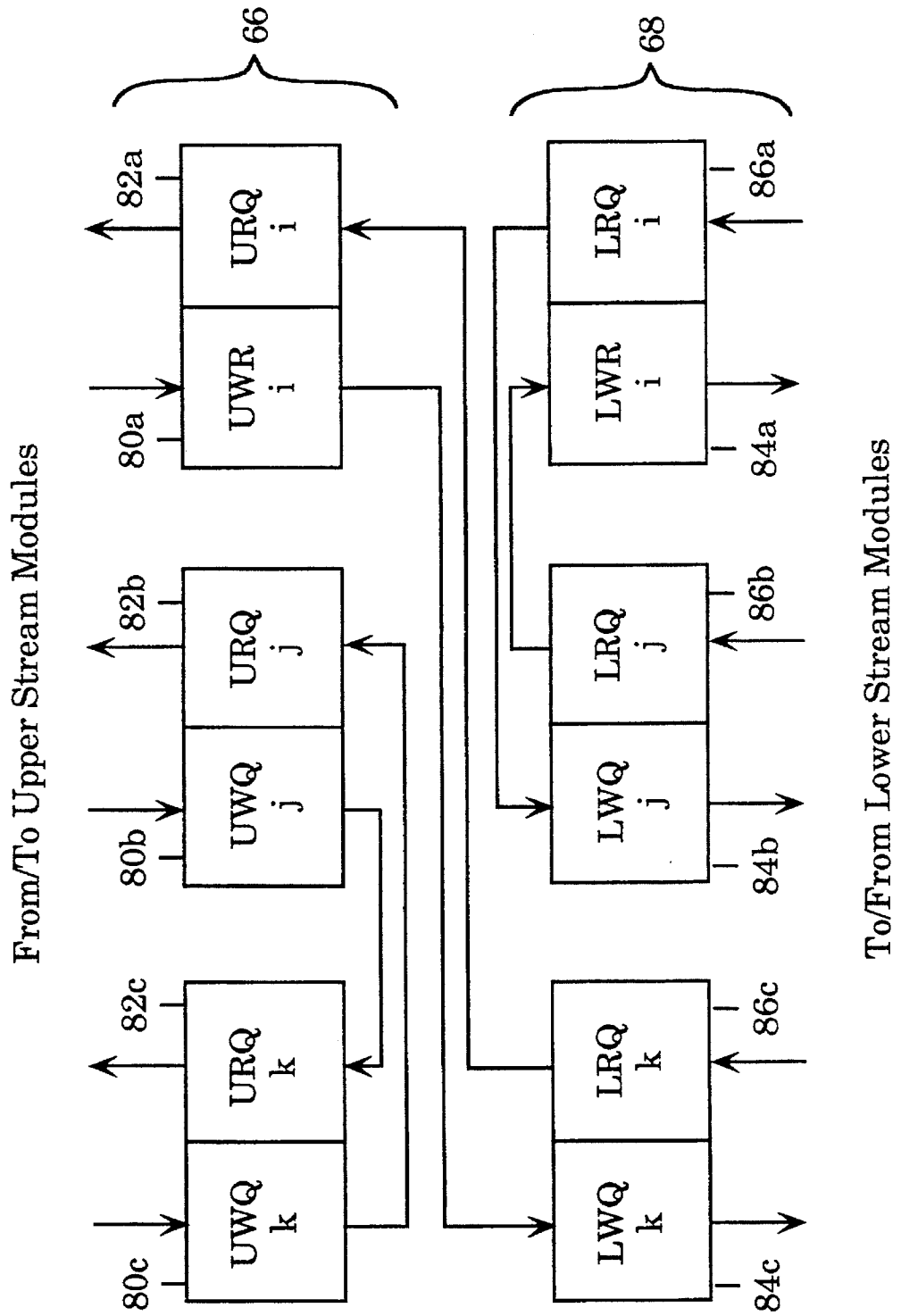
FIG. 5 illustrates the manners in which the upper and lower ports of the multiplexing non-device specifying stream module can be spliced together.

Referring now to FIG. 5, a block diagram illustrating the manners in which upper and lower ports 66 and/or 68 can be spliced together is shown. As illustrated, an upper port 66a may be spliced with a lower port 68c in a straight forward manner, enabling data to flow "downstream" through the connected upper and lower write queues 80a and 84c, and "upperstream" through the connected upper and lower read queues 82a and 86c. However, an upper port 66b may be spliced with another upper port 66c in a loopback manner, enabling data to flow "downstream" and then redirected "upperstream" through the connected upper write and read queues 80b and 82c as well as through the connected upper write and read queues 80c and 82b. Similarly, a lower port 68a may be spliced with another lower port 68b in a loopback manner, enabling data to flow "upstream" and then redirected "downstream" through the connected lower read and write queues 86a and 84b as well as through the connected lower read and write queues 86b and 84a.

Referring now to FIG. 6, a block diagram illustrating the key data elements maintained in an associated upper or lower read and write queue control and state data area 62 or 64 is shown. As illustrated, an associated upper or lower read and write queue control and state data area 62 or 64 comprises the standard write and read queue control and state information 90 and 92 for the corresponding write and read queues 80–86, i.e. queue head pointer, queue tail pointer, etc., which are well known and will not be further described.

Additionally, an associated upper or lower read and write queue control and state data area 62 or 64 further comprises an identifier 70, an indicator 72, an original owner 74, a current owner 76, and a current owner state 77 for the corresponding port 66 or 68. The identifier 70 uniquely identifies the port 66 or 68, whereas the indicator 72 indicates whether the port 66 or 68 is an upper or lower port 66 or 68. The original owner 74 identifies the upper stream 35 who owned the port 66 or 68 originally, i.e. for an upper port 66, the upper stream 35 who caused itself to be attached, and for a lower port 68, the upper stream 35 who caused the lower stream 37 to be attached. The current owner 74 identifies the current assignee upper stream owner 35, whereas the current owner state 76 indicates whether the current assignee upper stream owner 35 has accepted the assignment or not, which will be described in more detail below.

Furthermore, an associated upper or lower read and write queue control and state data area 62 or 64 comprises a destination port identifier 78, and a destination port state 88. The destination port identifier 78 identifies the connecting upper or lower port 66 or 68, whereas the destination port state 88 indicates whether the destination port 66 or 68 is actually connected or the connection is merely pending.

Figure 7:
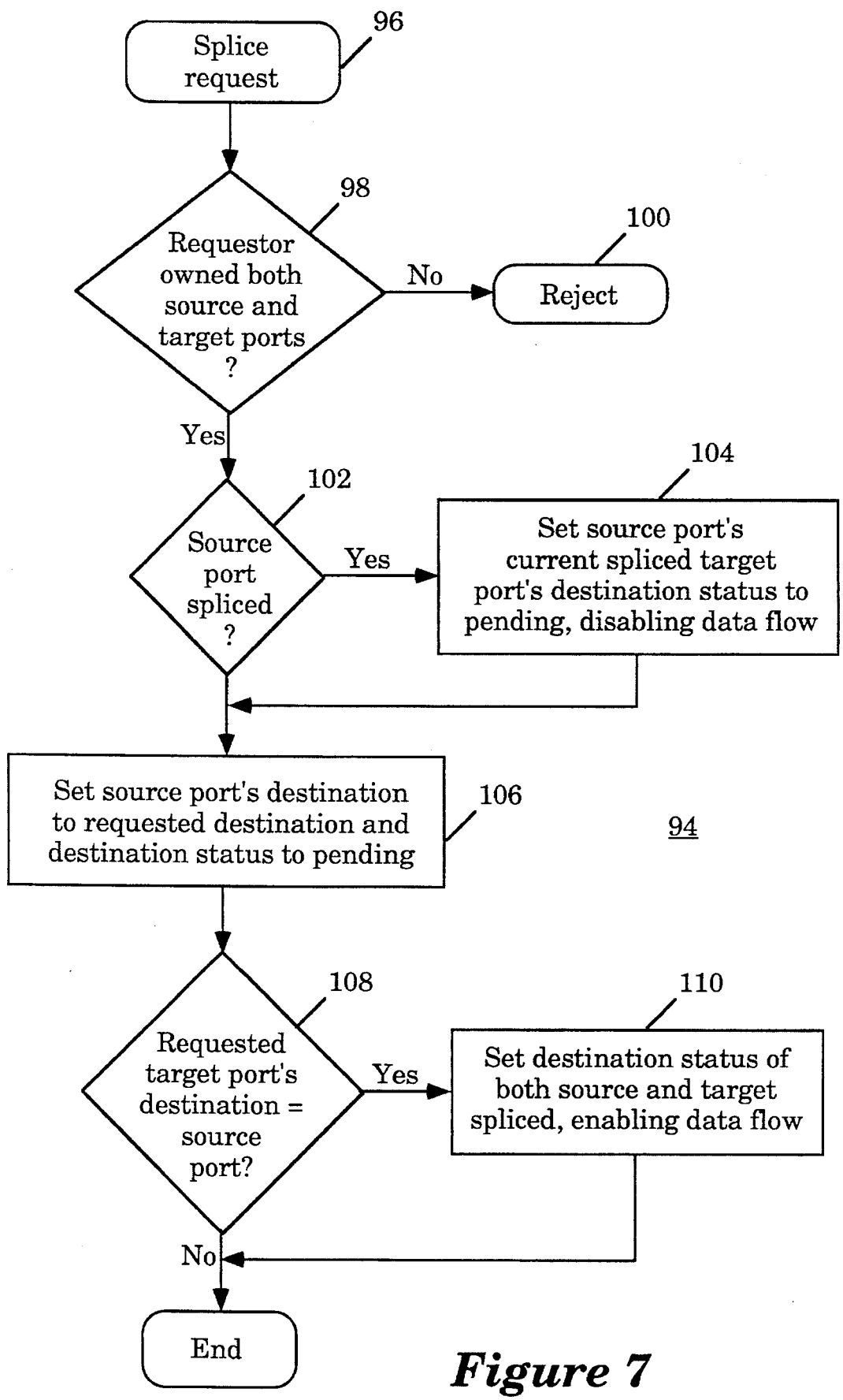
FIG. 7 illustrates the operation flow of the splice function of the splice/unsplice routine of FIG. 4.

Referring now to FIG. 7, a block diagram illustrating the operation flow of the splice function of a preferred "unidirectional" embodiment of the splice/unsplice service routine 58 is shown. Upon receipt of a splice request for splicing two ports together, step 96, the splice/unsplice service routine 58 determines whether the requester upper stream 35 owns both the source and target ports 66 and/or 68 of the splice request. If the splice/unsplice service routine 58 determines that the requester upper stream 35 does not own both the source and target ports, the splice request is rejected, step 100. If the splice/unsplice service routine 58 determines that the requester upper stream 35 does own both the source and target ports, the splice/unsplice service routine 58 further determines whether the source port is currently spliced to another port, step 102.

If the splice/unsplice service routine 58 determines that the source port is currently spliced to another port, the splice/unsplice service routine 58 sets the spliced other port's destination port status to "pending", thereby preemptably disconnecting the data flow path between the requested source port and its current spliced other port, step 104. Upon determining that the source port is currently not spliced to another port, or severing the source port's current connection to another port, the splice/unsplice service routine 58 then preemptably sets the source port's destination port to the requested target port as well as the source port's destination port status to "pending", step 106.

Upon setting the source port's destination port to the requested target port as well as the source port's destination port status to "pending", the splice/unsplice service routine 58 further determines whether the requested target port's destination port equals the requested source port, step 108. If the splice/unsplice service routine 58 determines that the requested target port's destination port equals the requested source port, the splice/unsplice service routine 58 sets the destination port status of both the requested source and target ports to "spliced", thereby enabling a data flow path between the requested ports, step 110. Upon determining that the requested target port's destination port does not equal the requested source port, or upon setting the destination port status of both the requested source and target ports to "spliced", no further action is taken by the splice/unsplice service routine 58.

Figure 8:
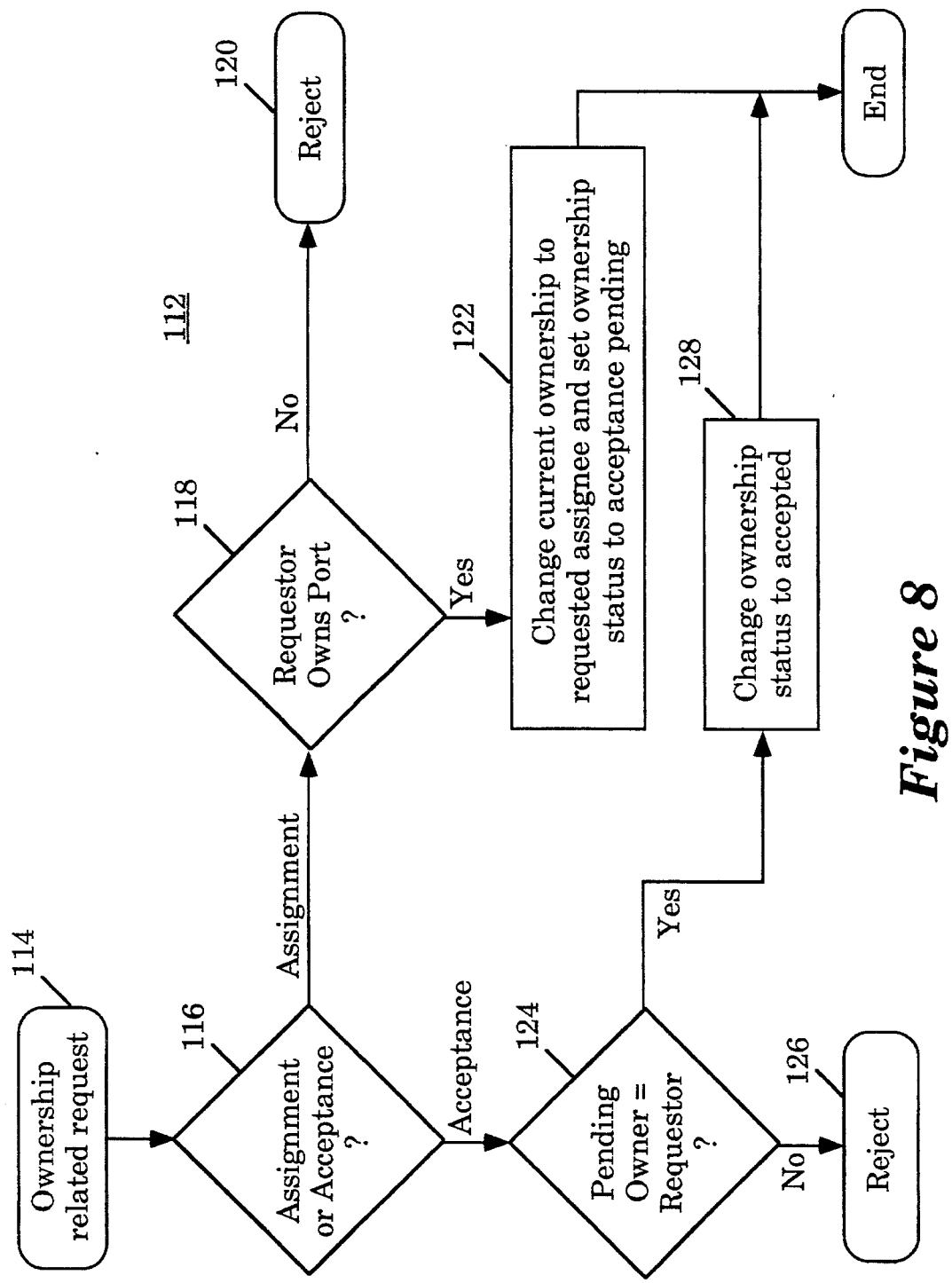
FIG. 8 illustrates the operation flow of the change ownership routine of FIG. 4.

Referring now to FIG. 8, a block diagram illustrating the operation flow of the change ownership routine 60 is shown. Upon receipt of an ownership related request, the change ownership routine 60 determines whether it is an assignment or acceptance request, step 116. If the change ownership routine 60 determines that the request is for assignment, the change ownership routine 60 further determines if the requester owns the object port, step 118. As described earlier, the requester may be an original owner or an assigned current owner. If the change ownership routine 60 determines that the requester does not own the object port, the change ownership routine 60 rejects the request, step 120. If the change ownership routine 60 determines that the requester does not own the object port, the change ownership routine 60 changes the current ownership of the object port to the requested assignee and sets the ownership status to "acceptance pending", step 122.

On the other hand, if the change ownership routine 60 determines that the request is for acceptance, the change ownership routine 60 further determines if the pending owner of the object port equals the requester, step 124. If the change ownership routine 60 determines that the pending owner of the object port does not equal the requester, the change ownership routine 60 rejects the request, step 126. If the change ownership routine 60 determines that the pending owner of the object port does equal the requester, the change ownership routine 60 sets the ownership status to "accepted", step 128.

Referring now to FIGS. 9a–9d, four diagrams illustrating four exemplary usage of the present invention are shown. For the purpose of illustration, a solid line denotes a logical connection whereas, a dotted line denotes a severed logical connection. Based on the illustrations to follow, it will be appreciated that many variations can be made to the manner in which the "multiplexing" non-device specific stream module 36c of the present invention is used for dynamically managing stream I/O "data channels".

Figure 9A:
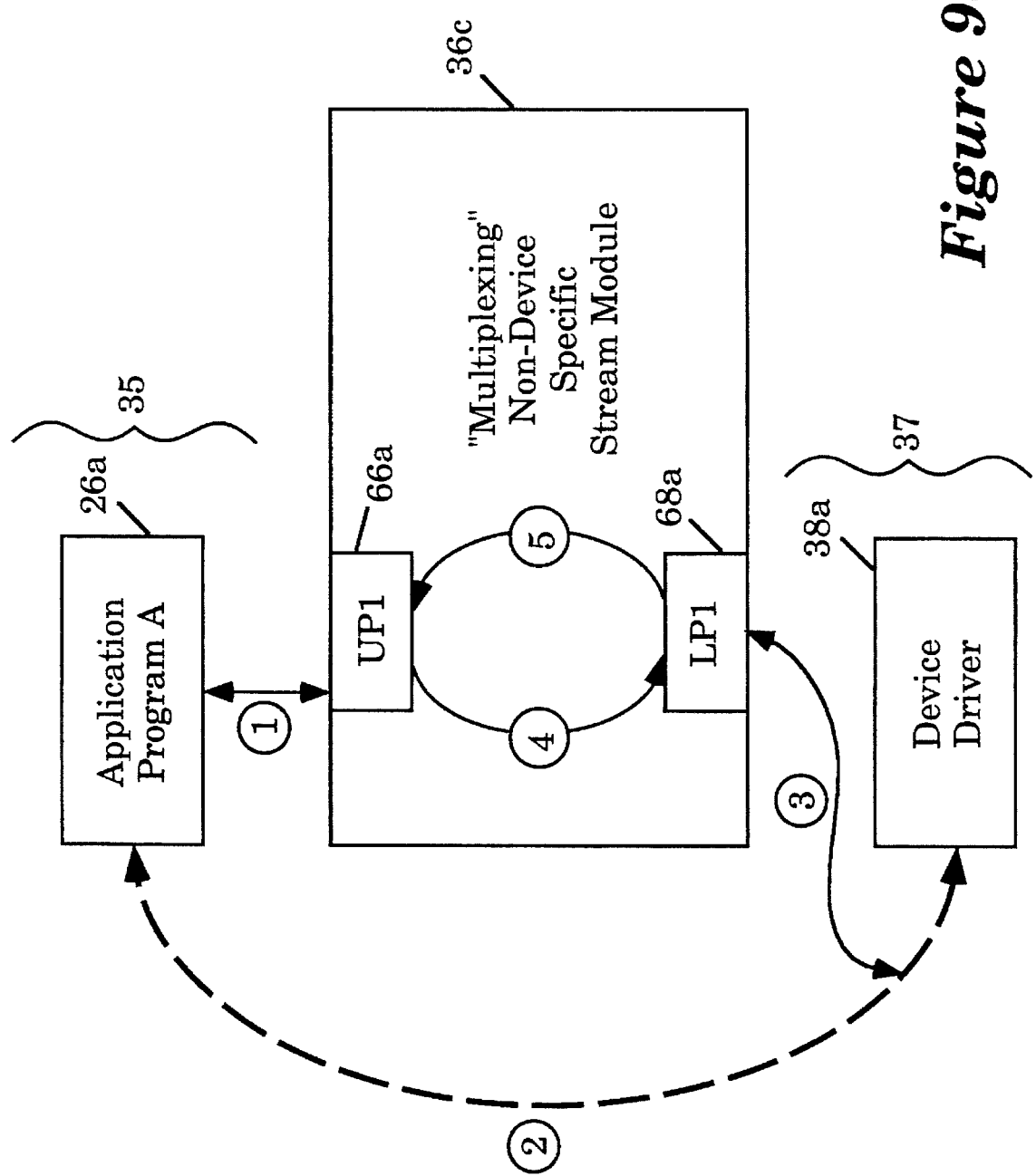
FIGS. 9a, 9b, 9c and 9d illustrate four exemplary manners in which the present invention can be used.

FIG. 9a illustrates a straight forward usage of the present invention to access a device driver A 38a by an application program A 26a. As illustrated, an upper stream 35 including application program A 26a first attaches itself to an upper port 66a of the multiplexing non-device specific stream module 36c of the present invention, operation (1), and to a lower stream 37 including the device driver A 38a, operation (2). The upper stream 35 then links the lower stream 37 to a lower port 68a of the multiplexing non-device device specific stream module 36c of the present invention, operation (3), severing its direct connection to the lower stream 37.

As described earlier, the upper stream 35 is now the owner of both the upper and lower ports 66a and 68a. The upper stream 35 then requests the upper port 66a be spliced with the lower port 68a, as well as the lower port 68a be spliced with the upper port 66a, operations (4) and (5), thus establishing a data path and enabling data to flow between the upper and lower streams 35 and 37 through the two connected ports 66a and 68a. It will be appreciated that many independent accesses involving many upper and lower ports can be made by numerous upper streams in such manner.

Figure 9B:
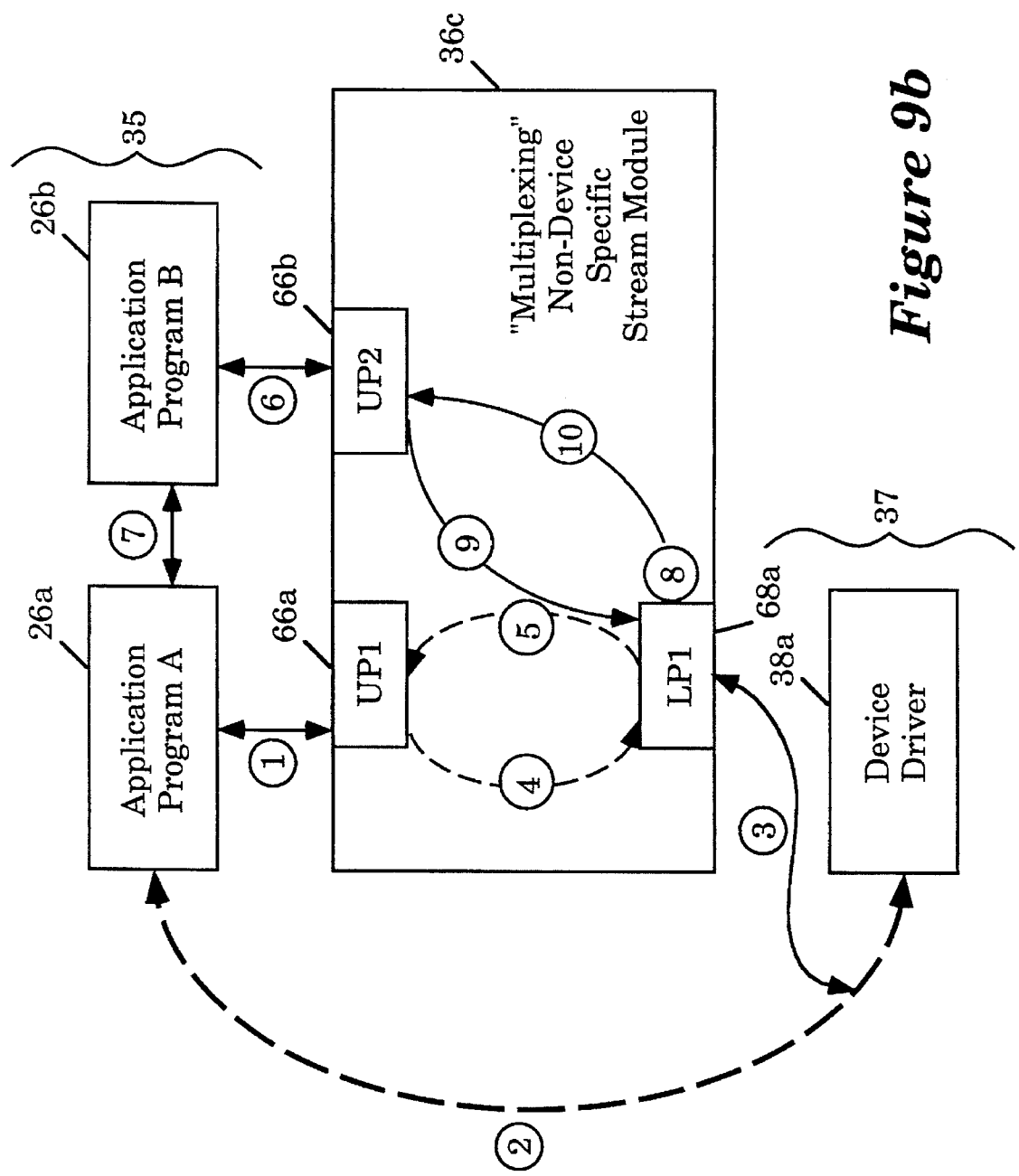

FIG. 9b illustrates an exemplary usage of the present invention for cooperative alternating access to a device driver A 38a by two application programs A and B, 26a and 26b. As illustrated, a first upper stream 35 including the application program A 26a establishes a connection to the lower stream 37 including device driver A 38a through the five operations illustrated in FIG. 9a, operations (1)–(5). The first upper stream 35 then accesses the device driver A 38a through the connections between the first upper port 66a and the lower port 68a.

Similarly, a second upper stream 35 including the application program B 26b attaches itself to the second upper port 66b of the multiplexing non-device specific stream module 36c of the present invention, operation (6). To access the device driver A 38a, the second upper stream 35 negotiate with the first upper stream 35 to have the ownership of the lower port 38a temporarily assigned to the second upper stream 35 including the application program B 26b, operation (7). If the two upper streams 35 agree to the temporary ownership changes, the first upper stream 35 assigns the ownership to the second upper stream 35, operation (8). As described earlier, the assignment of ownership to the lower port 68a severs the connections between the first upper port 66a and the lower port 68a.

The second upper stream 35 then requests the second upper port 66b be spliced with the lower port 68a, as well as the lower port 68a be spliced with the second upper port 66b, operations (9) and (10), thus establishing a data path and enabling data to flow between the second upper stream 35 and the lower stream 37 through the second upper port 66b and the lower port 68a.

To access the device driver A 38a again, the first upper stream 35 in like manner obtains ownership of the lower port 68a back from the second upper stream 35, thus severing the connections between the second upper port 66b and the lower port 68a. The first upper stream 35 then re-splices the first upper port 66a and the lower port 68a together again. Therefore, the two upper streams 35 cooperate with each other and access the device driver A 38a in an alternating manner. It will be appreciated that many independent negotiations between cooperative upper streams involving many upper and lower ports can take place at the same time.

Figure 9C:
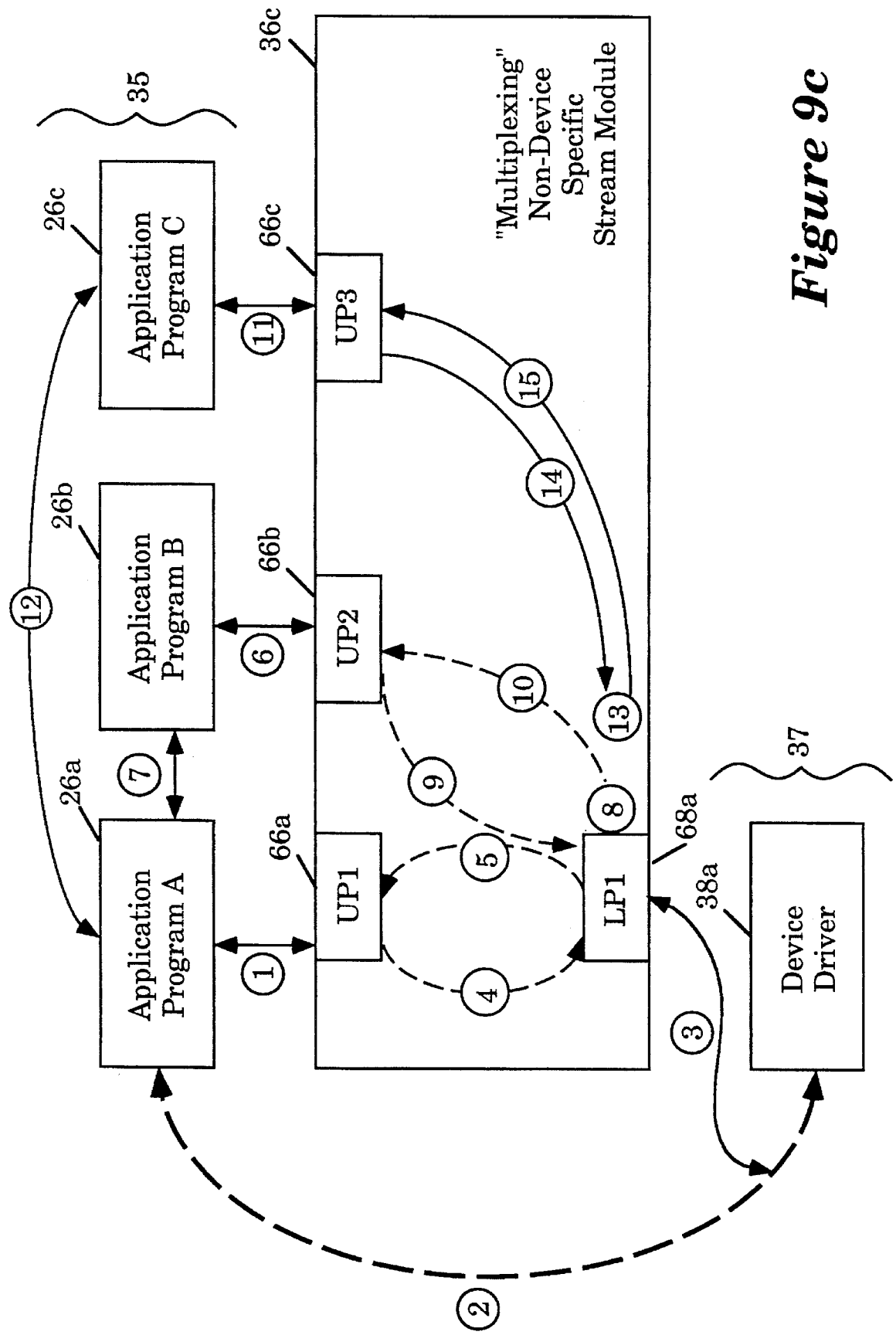

FIG. 9c illustrates an exemplary usage of the present invention for preemptive alternating access to a device driver A 38a by two application programs B and C, 26b and 26c. As illustrated, a first upper stream 35 including the application program A 26a, acting as a server, establishes a connection to the lower stream 37 including device driver A 38a through the five operations illustrated in FIG. 9a, operations (1)–(5).

A second upper stream 35 including the application program B 26b, acting as a client, then establishes a connection to the lower stream 37 including device driver A 38a through the five operations illustrated in FIG. 9b, operations (6)–(10). The second upper stream 35 then accesses the device driver A 38a through the connections between the second upper port 66b and the lower port 68a.

Similarly, a third upper stream 35 including the application program B 26c attaches itself to the third upper port 66c of the multiplexing non-device specific stream module 36c of the present invention, operation (11). To access the device driver A 38a, the third upper stream 35 negotiate with the first upper stream 35 to have the ownership of the lower port 38a temporarily assigned to the third upper stream 35 including the application program C 26c, operation (12). If under a priority policy being implemented by the first upper stream 35, the third upper stream 35 has higher priority than the second upper streams 35, the first upper stream 35 being the original owner preemptively assigns the ownership from the second upper stream 35 to the third upper stream 35 operation (13). As described earlier, the re-assignment of ownership to the lower port 68a severs the connections between the second upper port 66b and the lower port 68a.

Upon accepting the ownership, the third upper stream 35 then requests the third upper port 66c be spliced with the lower port 68a, as well as the lower port 68a be spliced with the third upper port 66c, operations (14) and (15), thus establishing a data path and enabling data to flow between the third upper stream 35 and the lower stream 37 through the third upper port 66c and the lower port 68a.

At appropriate time, as governed by its priority policy, the first upper stream 35 in like manner preemptively reverts the ownership of the lower port 68a back to the second upper stream 35, thus severing the connections between the third upper port 66c and the lower port 68a. The second upper stream 35 then re-splices the second upper port 66b and the lower port 68a together again. Therefore, the second and third upper streams 35 can access the device driver A 38a in an alternating manner governed by a priority policy implemented by the first upper stream 35. It will be appreciated that many upper streams as well as many upper and lower ports may be involved in such server based preemptive priority policy governed access scheme.

Figure 9D:
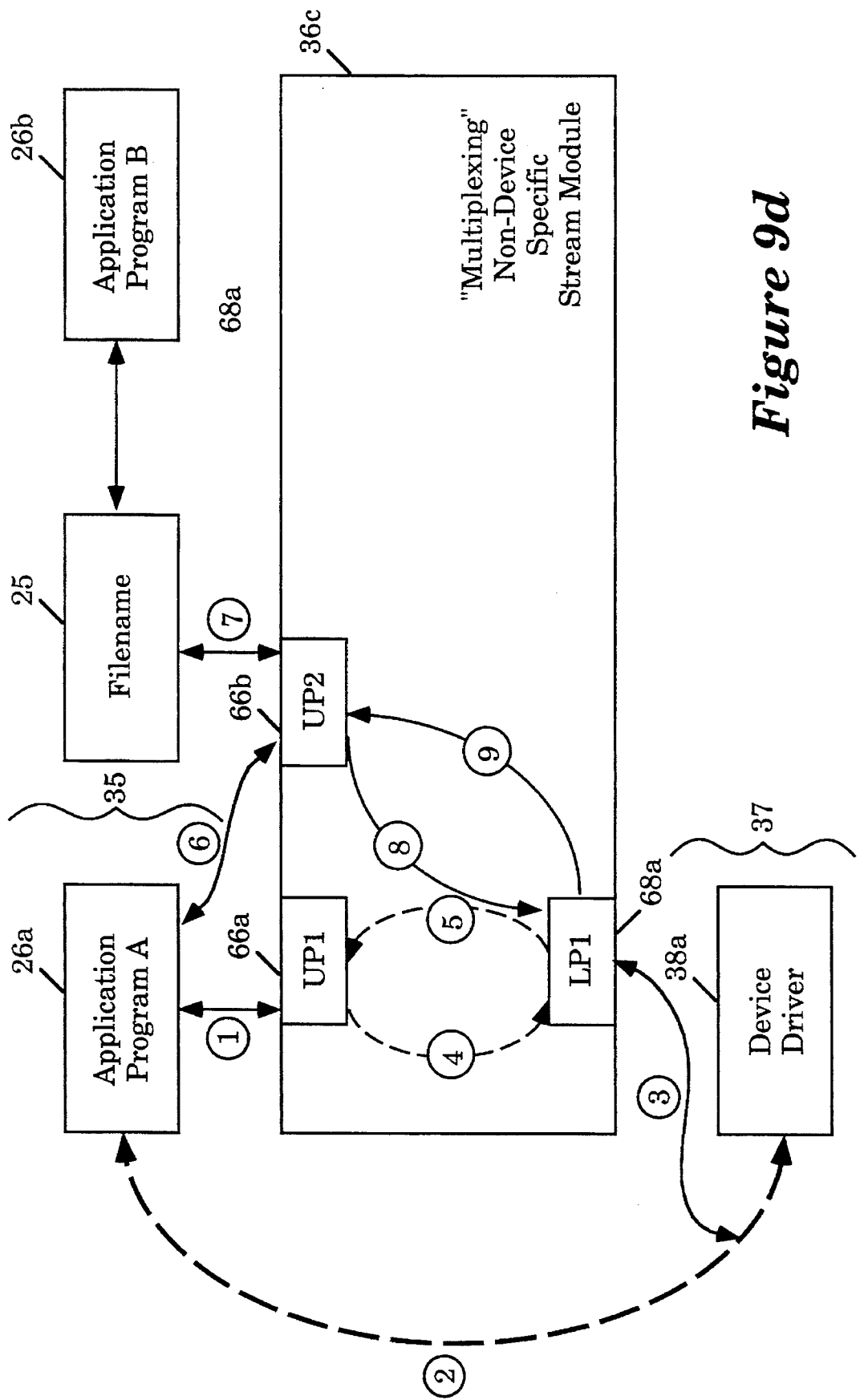

The above three exemplary usage of the "multiplexing" non-device specific stream module 36c of the present invention all require the application programs 26a–26c to have knowledge of the present invention. However, in an operating system where assignment of a file name to a stream module, and data pipe are supported, the present invention may be used by application programs having no knowledge of the present invention. FIG. 9d illustrate such an exemplary usage of the present invention. As illustrated, a first upper stream 35 including the application program A 26a, acting as a server, establishes a connection to the lower stream 37 including device driver A 38a through the five operations illustrated in FIG. 9a, operations (1)–(5).

To allow application program B 26b to access device driver A 38a, the first upper stream 35 also attaches itself to a second upper port 66b of the multiplexing non-device specific stream module 36c of the present invention, operation (6). The first upper stream 35 then causes a filename to be assigned to the second upper port 66b, operation (7), thereby allowing the application program B 26b to read and write data to the first upper port 66b.

At the appropriate time, as governed by the priority policy of application program A 26a, the upper stream 35 splices the second upper port 66b to the lower port 68a as well as the lower port 68a to the second upper port 66a, enabling data flow between the application program B 26b and the lower stream 37 through the two ports 66b and 68a. At another appropriate time, also governed by the priority policy of application program A 26a, the upper stream 35 unsplices the connection between the second upper port 66b and the lower port 68a, disabling data flow between the application program B 26b and the lower stream 37 through the two ports 66b and 68a. Therefore, data can be sent between the second application program B 26b and the device driver A 38, without requiring the application program B 26b to have any knowledge of the "multiplexing" non-device specific stream module 36c of the present invention.

While the present invention has been described in terms of presently preferred and alternate embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

What is claimed is:

1. A computer implemented method comprising the steps of:

(a) a plurality of upper streams attaching themselves to a plurality of upper ports, each of the upper streams including a program module executing in an user space of a computer system, each of the upper ports being stored in a first storage area mapped into a system space of the computer system, and each of the upper ports including a queue structure;

(b) said upper streams causing a plurality of lower streams to be attached to a plurality of lower ports, each of the lower streams including a program module executing in the system space, and each of the lower ports being stored in a second storage area mapped into the system space, and each of the lower ports including a queue structure;

(c) said upper streams causing data to be moved downstream from themselves into said queue structures of said upper ports, and moving data upstream into themselves from said queue structures of said upper ports;

(d) said lower streams moving data downstream from said queue structures of said lower ports into themselves, and causing data to be moved upstream from themselves into said queue structures of said lower ports;

(e) said upper streams requesting a splice and unsplice routine executing in the system space to logically splice and unsplice selected ones of said upper and lower ports to enable and disable data flow between selected pairs of said upper and lower streams; and (f) said splicing and unsplicing routine logically splicing and unsplicing said selected ones of said upper and lower ports in response to said requests, thereby selectively enabling and disabling data flow between selected pairs of said upper and lower streams.

2. The method as set forth in claim 1, wherein, said method further comprises the steps of:

(g) said upper streams requesting a change ownership routine executing in the system space to change ownership of selected ones of said upper and lower ports; and (h) said change ownership routine changing ownership of said selected ones of said upper and lower ports in response to said ownership change requests.

3. The method as set forth in claim 2, wherein said change ownership routine secures said changing of ownership in said step (h) based on port ownership.

4. The method as set forth in claim 2, wherein said change ownership routine changes ownership of a first port from a first upper stream to a second upper stream by first placing said first port in an ownership assignment pending acceptance state in response to a request by said first upper stream to change ownership from said first upper stream to said second upper stream, and then changing ownership of said first port in response to a subsequent request by said second upper stream to accept ownership of said first port.

5. The method as set forth in claim 2, wherein, said step (a) comprises a first and a second of said upper streams attaching themselves to a first and a second of said upper ports;

said step (b) comprises said first upper stream causing a first of said lower streams to be attached to a first of said lower ports;

said step (c) comprises said first and second upper streams causing data to be moved downstream from themselves into the queue structures of said first and second upper ports respectively, and moving data upstream into themselves from the queue structures of said first and second upper ports respectively;

said step (d) comprises said first lower stream moving data downstream from the queue structure of said first lower port into itself, and causing data to be moved upstream from itself into the queue structure of said first lower port;

said step (e) comprises said first upper stream first requesting said splice and unsplice routine to logically splice said first upper port and said first lower port to enable data flow between said first upper stream and said first lower stream, followed by said second upper stream subsequently requesting said splice and unsplice routine to logically splice said second upper port and said first lower port to enable data flow between said second upper stream and said first lower stream;

said step (f) comprises said splicing and unsplicing routine first logically splicing said first upper port and said first lower port together in response to said first request, thereby enabling data flow between said first upper stream and said first lower stream, followed by said splicing and unsplicing routine logically splicing said second upper port and said first lower port together in response to said subsequent splicing request, thereby enabling data flow between said second upper stream and said first lower stream, and disabling data flow between said first upper stream and said first lower stream;

said step (g) comprises said first upper stream making a first ownership change request to said change ownership routine to change ownership of said first lower port from said first upper stream to said second upper stream before said second upper stream makes said subsequent splicing request; and said step (h) comprises said change ownership routine changing ownership of said first lower port from said first upper stream to said second upper stream in response to said first ownership change request before said second upper stream makes said subsequent splicing request.

6. The method as set forth in claim 2, wherein, said step (a) comprises a first, a second, and a third of said upper streams attaching themselves to a first, a second, and a third of said upper ports;

said step (b) comprises said first upper stream causing a first of said lower streams to be attached to a first of said lower ports;

said step (c) comprises said second, and third upper streams causing data to be moved downstream from themselves into the queue structures of said second, and third upper ports respectively, and moving data upstream into themselves from the queue structures of said second, and third upper ports respectively;

said step (d) comprises said first lower stream moving data downstream from the queue structure of said first lower port into itself, and causing data to be moved upstream from itself into the queue structure of said first lower port;

said step (e) comprises said second upper stream first requesting said splice and unsplice routine to logically splice said second upper port and said first lower port to enable data flow between said second upper stream and said first lower stream, followed by said third upper stream subsequently requesting said splice and unsplice routine to logically splice said third upper port and said first lower port to enable data flow between said third upper stream and said first lower stream;

said step (f) comprises said splicing and unsplicing routine first logically splicing said second upper port and said first lower port together in response to said first request, thereby enabling data flow between said second upper stream and said first lower stream, followed by said splicing and unsplicing routine logically splicing said third upper port and said first lower port together in response to said subsequent splicing request, thereby enabling data flow between said third upper stream and said first lower stream, and disabling data flow between said second upper stream and said first lower stream;

said step (g) comprises said first upper stream making a first ownership change request to said change ownership routine to change ownership of said first lower port from said first upper stream to said second upper stream before said second upper stream makes said first splicing request, and said first upper stream making a conditional subsequent ownership change request based on a priority policy to said change ownership routine to change ownership of said first lower port from said second upper stream to said third upper stream before said third upper stream makes said subsequent splicing request; and said step (h) comprises said change ownership routine changing ownership of said first lower port from said first upper stream to said second upper stream in response to said first ownership change request before said second upper stream makes said first splicing request, and said change ownership routine changing ownership of said first lower port from said second upper stream to said third upper stream in response to said subsequent ownership change request if it is made, before said third upper stream makes said subsequent splicing request.

7. The method as set forth in claim 2, wherein, said step (a) comprises a first of said upper streams attaching itself to a first and a second of said upper ports;

said step (a) further comprises said first upper stream causing a filename to be assigned to said second upper port;

said step (b) comprises said first upper stream causing a first of said lower streams to be attached to a first of said lower ports;

said step (c) comprises a program module executing in said user space causing data to be moved downstream from itself into the queue structure of said second upper port through a data pipe logically connected to said assigned filename, and moving data upstream into itself from the queue structure of said second upper port through said data pipe;

said step (d) comprises said first lower stream moving data downstream from the queue structure of said first lower port into itself, and causing data to be moved upstream from itself into the queue structure of said first lower port;

said step (e) comprises said first upper stream requesting said splice and unsplice routine to logically splice said second upper port and said first lower port to enable data flow between said data pipe connected program module and said first lower stream; and said step (f) comprises said splicing and unsplicing routine logically splicing said second upper port and said first lower port together in response to said splicing request, thereby enabling data flow between said data pipe connected program module and said first lower stream.

8. The method as set forth in claim 1, wherein, said splicing and unsplicing routine splices said selected ones of said upper and lower ports in a preemptable manner.

9. The method as set forth in claim 1, wherein, said splicing and unsplicing routine splices a first and a second port together by first placing said first and second ports in a splice pending state in response to a request to splice said first port to said second port, and then splicing said first and second ports together in response to a subsequent request to splice said second port to said first port.

10. The method as set forth in claim 1, wherein, said step (a) comprises a first of said upper streams attaching itself to a first of said upper ports;

said step (b) comprises said first upper stream causing a first of said lower streams to be attached to a first of said lower ports;

said step (c) comprises said first upper stream causing data to be moved downstream from itself into the queue structure of said first upper port, and moving data upstream into itself from the queue structure of said first upper port;

said step (d) comprises said first lower stream moving data downstream from the queue structure of said first lower port into itself, and causing data to be moved upstream from itself into the queue structure of said first lower port;

said step (e) comprises said first upper stream requesting said splice and unsplice routine to logically splice said first upper port and said first lower port to enable data flow between said first upper stream and said first lower stream; and said step (f) comprises said splicing and unsplicing routine logically splicing said first upper port and said first lower port together in response to said request, thereby enabling data flow between said first upper stream and said first lower stream.

11. The method as set forth in claim 1, wherein, said splicing and unsplicing routine secures said splicing and unsplicing in said step (f) based on port ownership.

12. An apparatus comprising:

a first storage area mapped into a system space, storing a plurality of upper ports staging data being moved downstream from and upstream to a plurality of upper streams attached to said upper ports, wherein each of said upper ports includes a queue structure and each of said upper streams includes at least one program module executing in an user space;

a second storage area mapped into said system space, storing a plurality of lower ports staging data being moved downstream to and upstream from a plurality of lower streams attached to said lower ports, wherein each of said lower ports includes a queue structure and each of said lower streams includes at least one program module executing in said system space; and an execution unit executing said upper streams in at least said user space, said lower streams in said system space, and a splice/unsplice program module in said system space, wherein said splice/unsplice program module logically splices said upper and lower ports together and unsplices said upper and lower ports from each other, thereby enables and disables data flow between said attached upper and lower streams.

13. The apparatus as set forth in claim 12, wherein, each of said queue structures of said upper ports comprises an upper write queue staging data being moved downstream from an upper stream, and an upper read queue staging data being moved upstream to the upper stream;

each of said queue structures of said lower ports comprises a lower write queue staging data being moved downstream to a lower stream, and a lower read queue staging data being moved upstream from the lower stream.

14. The apparatus as set forth in claim 12, wherein, each of said upper and lower ports further comprises a data area associated with the queue structure storing a port identifier uniquely identifying the port, and a level indicator indicating whether the port is an upper port or a lower port.

15. The apparatus as set forth in claim 12, wherein, each of said upper and lower ports further comprises a data area associated with the queue structure storing an owner identifier identifying an original owner upper stream of the port, an assignee identifier identifying a current assignee owner upper stream of the port, and an assignee status denoting whether acceptance of ownership assignment is still to be given or has been given by the current assignee owner upper stream of the port.

16. The apparatus as set forth in claim 12, wherein, each of said upper and lower ports further comprises a data area associated with the queue structure storing a destination port identifier identifying one of said upper and lower ports as data flow destination of the port, and a destination port status indicating whether the identified upper or lower is still to be spliced or has been spliced with the port.

17. The apparatus as set forth in claim 12, wherein, said execution unit is further executing an upper write put routine in the system space, said upper write put routine placing said data being moved downstream into the queue structures of said upper ports on behalf of said upper streams.

18. The apparatus as set forth in claim 12, wherein said execution unit is further executing a lower read put routine in the system space, said lower read put routine placing said data being moved upstream into the queue structures of said lower ports on behalf of said lower streams.

19. The apparatus as set forth in claim 12, wherein, said execution unit is further executing a plurality of queue control routines in the system space, said queue control routines moving said data being moved downstream and upstream between the queue structures of said upper and lower ports.

20. The apparatus as set forth in claim 12, wherein, said execution unit is further executing a change ownership routine in the system space, said change ownership routine temporarily changing ownership of said upper and lower ports among said upper streams.

21. The apparatus as set forth in claim 12, wherein, said execution unit is further executing a query ownership routine in the system space, said query ownership routine responding to port ownership queries about said upper and lower ports by said upper streams.

22. A method for providing stream multiplexing support to a computer system comprising the steps of:

(a) providing a first storage area to be mapped into a system space of the computer system for storing a plurality of upper ports to be used for staging data being moved downstream from and upstream to a plurality of upper streams attached to said upper ports, wherein each of said upper ports includes a queue structure and each of said upper streams includes at least one program module executing in an user space;

(b) providing a second storage area to be mapped into said system space for storing a plurality of lower ports to be used for staging data being moved downstream to and upstream from a plurality of lower streams attached to said lower ports, wherein each of said lower ports includes a queue structure and each of said lower streams includes at least one program module executing in said system space; and (c) providing an execution unit to be used for executing said upper streams in at least said user space, said lower streams in said system space, and a splice/unsplice program module in said system space, wherein said splice/unsplice program module logically splices said upper and lower ports together and unsplices said upper and lower ports from each other, thereby enables and disables data flow between said attached upper and lower streams.

\* \* \* \* \*